INVENTOR.
Thomas F. Stacy
BY
Parker & Prochnow.
ATTORNEYS.

INVENTOR.
Thomas F. Stacy
BY
Parker & Prochnow,
ATTORNEYS.

United States Patent Office 3,147,466

Patented Sept. 1, 1964

3,147,466
PILOT LIGHT SYSTEM

Thomas F. Stacy, Piqua, Ohio, assignor to The French Oil Mill Machinery Company, Piqua, Ohio Filed June 9, 1960, Ser. No. 35,037
1 Claim. (Cl. 340—252)

This invention relates to pilot light systems including electric circuits, particularly circuits of the type which are employed in connection with a plurality of units connected in series, to indicate whether or not the units are in operative condition.

It is common practice to employ pilot lights to indicate whether a circuit is completed or whether it is broken. Most pilot light systems of this type, however, do not indicate a broken portion of a circuit when the normal supply of current to the circuit is interrupted.

It is one of the objects of this invention to provide an electric circuit including a plurality of power-consuming units connected in series, with a pilot lamp which indicates when a unit becomes inoperative while the supply of operating current to the units is interrupted. It is also an object to provide a pilot light circuit in which the pilot light will become extinguished when any one of the units while connected with the supply of power becomes inoperative, and also to indicate an inoperative unit at times when the supply of operating current to such units is interrupted.

It is also an object to provide a pilot light system which includes two circuits through the pilot light and the units, one circuit including all of the units and the pilot light when the main supply of current to the units is interrupted.

In the accompanying drawings

Figure 1:
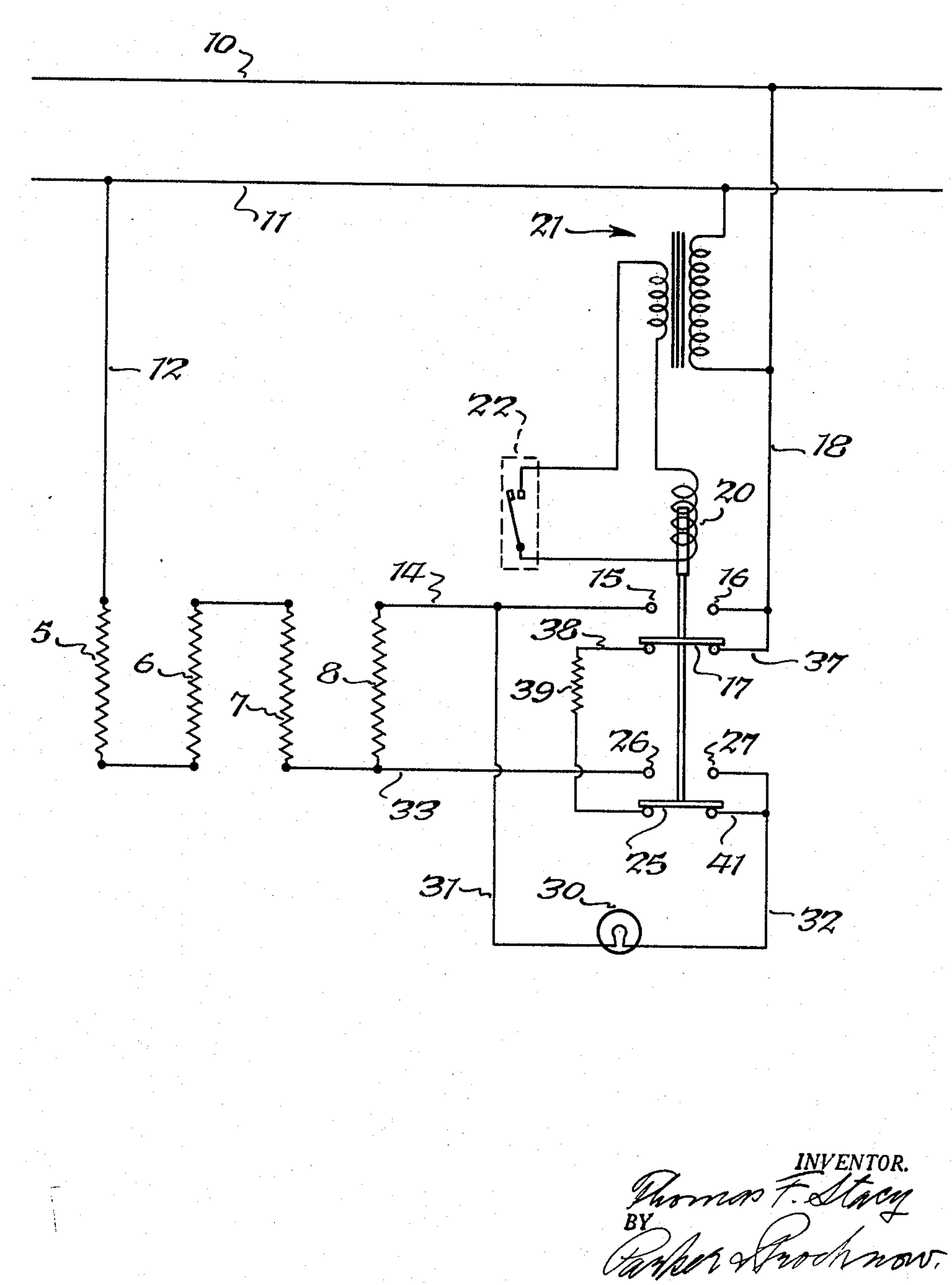
FIG. 1 shows diagrammatically by way of example a system of this type.

This system, in the particular construction shown by way of illustration of one embodiment of my invention, includes power actuated units 5, 6, 7 and 8 which are connected in series with each other and which receive electric current from a supply of power including lines 10 and 11. When the circuit is employed with four units, it could, for example, be assumed that each of the four units is constructed to operate on 110 volts and consequently the supply lines should carry 440 volts. These units may for example be heating elements in a platen or other device, and consequently it is important for an operator to know immediately whether the group of heating elements is or is not operating correctly. Any desired number of heating or other units may however be employed and different voltages other than those stated by way of example may be employed. The unit 5 is connected by a conductor 12 to the conductor 11 of the supply line, and the unit 8 is connected by means of a conductor 14 with one of the terminals 15 of a double pole, double throw switch, the other terminal 16 of which is connected by a conductor 18 to the supply line conductor 10. The switch includes a movable member 17 which, when in its upper position, connects the two terminals 15 and 16 and thus permits current to pass from the supply line 10 to the units.

The movable switch member may be moved into contact with the terminals 15 and 16 in any suitable manner, for example, by means of a solenoid or relay 20 having a core or plunger connected with the movable switch member 17. This solenoid is preferably in a lower voltage circuit, receiving power from the main supply lines through a transformer 21. This circuit may also include a thermostatic device 22 responsive to the temperature of the platen or other body heated by the units 5, 6, 7 and 8. Thus, when heat is required in the platen, the thermostatic device completes the circuit, including the solenoid 20, thus causing the switch member to move upwardly, in the construction shown, to connect the contacts 15 and 16.

There is also provided another movable switch member 25 which moves with the switch member 17 to connect a pair of contacts 26 and 27 when in its upper position, and connects another pair of contacts when in its lower position. This switch construction is employed in connection with a pilot light 30, one terminal of which is connected through conductor 31 with conductor 14 leading to one terminal of unit 8. The other terminal of the pilot light is connected by a branched conductor 32 with the switch terminal 27, and when the movable contact member 25 of the second switch is in its upper position, current will pass to terminal 26 and to a conductor 33 which connects with the opposite terminal of the unit 8. Consequently, when the contact member 25 is in its upper position, the pilot light 30 will be connected to conductors 14 and 33 which connect with the opposite terminals of the unit 8. The pilot light will consequently be subjected to a fraction of the voltage of the supply lines 10 and 11, in other words, to the voltage across the terminals of the unit 8. Consequently, it will be obvious that when any one of the units 5, 6, or 7 becomes inoperative to interrupt the current supply to it, no current will pass through the conductor 12, and also the pilot light will receive no current and will consequently become extinguished. However, if the unit 8 becomes inoperative or open-circuited, then current will flow through units 5, 6 and 7 through the circuit including the pilot light 30. Since the combined resistance of the units 5, 6 and 7 in series is very much lower than that of the filament of the pilot light 30, the voltage drop across the pilot light will be greatly increased above its rated voltage (110 v.), thus overloading and burning out the filament.

For further explanation to again use the voltages heretofore referred to, if the voltage between the supply lines 10 and 11 is 440 volts, then each of the four units will operate at 110 volts, which voltage will exist between the conductors 14 and 33 when the units 5, 6, 7 and 8 are in operation, and consequently the pilot light 30 be connected in parallel with one of said units and will operate at 110 volts. If any of these units 5, 6 and 7 has a break, then no current will pass through the conductor 12 so that the pilot light 30 will receive no current and becomes extinguished, but if the unit 8 is open-circuited its voltage lowering shunt effect relative to the pilot light 30 will be nullified. Then instead of 110 volts (one fourth of 440 v.) being applied across the pilot light 30, there will be applied thereto a voltage proportional to its proportion of the resistance of the new circuit including the units 5, 6 and 7 and the lamp 30 in series. Since the resistance of the filament of the pilot lamp is very much higher than the combined resistance of the units 5, 6 and 7 in series, most of the 440 volts will be applied across the lamp 30 thus burning out its filament.

The switch controlled by the solenoid 20 is also constructed to close another circuit to supply a much smaller current to the pilot light and through the units 5, 6, 7 and 8 when there is a demand for current by these units. In this circuit the units are connected in series with the pilot light. The movable switch member 17, when the main supply of current to the units is interrupted, will be in its lower position, as shown in the drawing, thus connecting a branch conductor 37 of conductor 18 to a conductor 38 connected through a resistance member 39 to one of the switch terminals with which the movable switch member 25 contacts when in its lower position. Consequently current is conducted through this movable switch member to a branch conductor 41 connected with the conductor 32 leading to the pilot light. Hence, when the movable switch members 17 and 25 are in their lower positions, they provide a circuit through the resistance 39, switch member 25, to the pilot light 30 and through conductor 31 to conductor 14. Consequently current at a reduced voltage will pass through the resistance 39 and the pilot light and through the units 5, 6, 7 and 8, and this resistance member 39 and the resistance of the pilot light cuts the current down to a small amount which will have very little effect on these units. However, if any of these units becomes open-circuited, the circuit through all of them and the pilot light is opened, resulting in the extinguishing of the pilot light.

It will be noted that the pilot light clearly shows the condition of the units 5, 6, 7 and 8, whether they are supplied with operating current or whether the supply of operating current to these units is interrupted.

Figure 2:
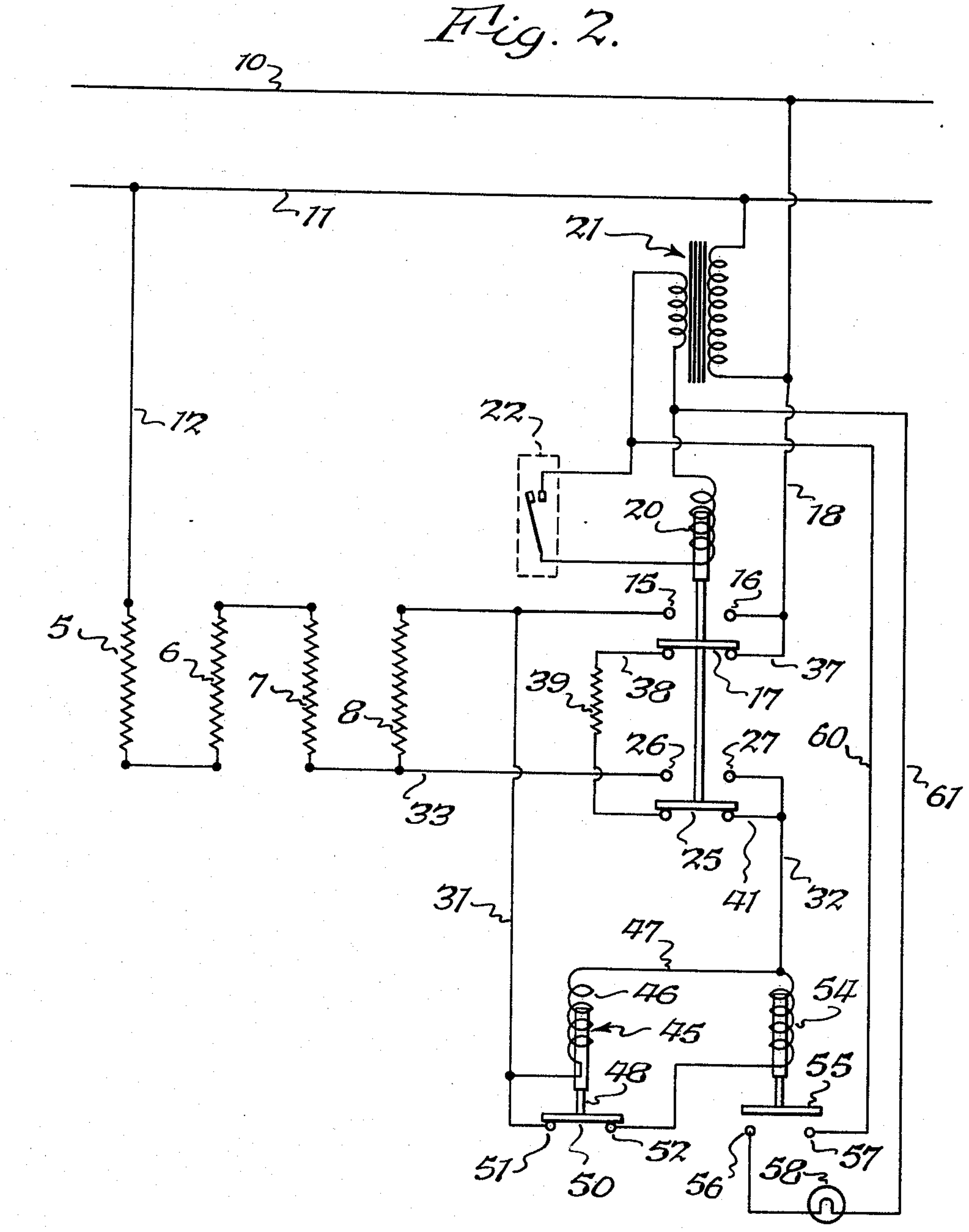
FIG. 2 shows diagrammatically a modified system.

In FIG. 2 I have shown a modification of my pilot light system in which the wiring is such that the pilot light becomes lighted only when any of the power-consuming units become burned out: In this modified form of my invention the electrical connections with the power-consuming units and the main switch are the same as in FIG. 1. The conductor 31 leading from the switch terminal 15 connects with an overload relay 45 provided with the usual coil 46 connected with a conductor 47 leading to the conductor 32. The coil 46 acts on a plunger 48 provided with a contact member 50 which normally rests on two terminals 51 and 52, thus completing a circuit to one terminal of coil 54 of a second relay, the other terminal of which is connected to the conductor 32. Consequently, when no overload exists, the coil 54 is energized, thus keeping its contact member 55 out of engagement with two terminals 56 and 57, which are included in a separate circuit leading to a pilot light 58, this separate circuit including conductors 60 and 61 which connect with the low voltage lines leading from the transformer 21.

As a result of these connections, if an overload of current passes to the overload relay 45, due for example to an open circuit in the unit 8, the contact member 50 will be drawn upwardly out of engagement with its terminals 51 and 52 so that no current passes to the coil 54 of the second relay, which permits its core to drop, thus causing the contact member 55 to connect the terminals 56 and 57, which results in the lighting of the pilot light 58. If a break occurs in any of the other units 5, 6 and 7, then of course no current will flow in the conductors 31 and 32, nor in the coil 54, so that the connector 55 will drop and again light the pilot light 58. If the contacts 17 and 25 of the main switch are in their lowered positions so that the overload relay 45 is in series with the units 5, 6, 7 and 8, then a break in any of the units will cause interruption of the current through the overload relay and through the coil 54 of the other relay, thus permitting the contact member 55 to drop into engagement with the terminals 56 and 57, thus causing the pilot light to become lighted.

The term "abnormal amount of current" is herein employed to indicate no current or an excessive current.

It will be understood that various changes in the details, materials and arrangements of parts which have been herein described and illustrated in order to explain the nature of the invention may be made by those skilled in the art within the principle and scope of the invention as expressed in the appended claim.

I claim:

In a pilot light system for indicating the operativeness of a plurality of power-consuming units connected in series with a supply of power, said system including a pilot light, a branch circuit, and a pair of pilot light control circuits, one of said pair of pilot light control circuits is connected in parallel with at least one of said units when said units receive power from said supply of power and when the other pilot light control circuit is open, said other pilot light control circuit being connected in series with said units when said supply of power is disconnected and when said first-mentioned of said pair of pilot light control circuits is open, an overload relay included in both of said pilot light control circuits, and a second relay controlling a circuit supplying current to said pilot light, said second relay having a gravity closable contact member in said last-mentioned circuit and said second relay including a coil normally energized by said overload relay to maintain said gravity closable contact member in open condition.

References Cited in the file of this patent

UNITED STATES PATENTS

| | | |
|---|---|---|
| 348,155 | Dyer | Aug. 24, 1886 |
| 1,080,493 | Smith | Dec. 2, 1913 |
| 1,118,454 | Weeks | Nov. 24, 1914 |
| 1,321,287 | Daly et al. | Nov. 11, 1919 |
| 2,123,699 | Kahn et al. | July 12, 1938 |
| 2,197,700 | MacGregor | Apr. 16, 1940 |
| 2,482,478 | Grandstaff | Sept. 20, 1949 |
| 2,930,961 | Lezan | Mar. 29, 1960 |
| 2,941,186 | Gelli | June 14, 1960 |
| 3,045,168 | Fellendorf | July 17, 1962 |

FOREIGN PATENTS

| | | |
|---|---|---|
| 517,120 | Great Britain | Jan. 22, 1940 |